Figure 1:
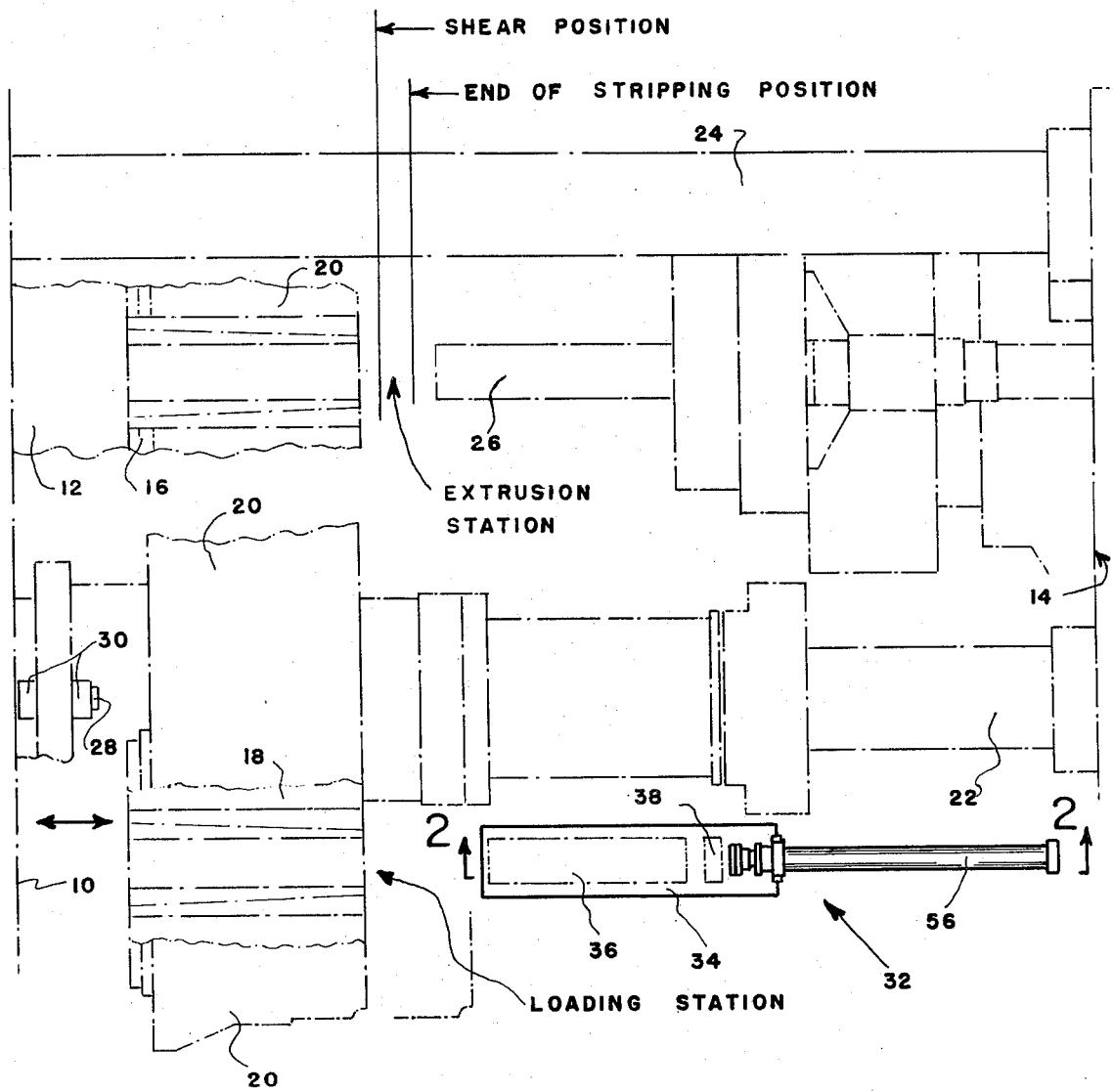

United States Patent [19]

Pollak et al.

[11] 3,818,745

[45] June 25, 1974

[54] METHOD AND APPARATUS FOR LOADING WORKPIECES IN A PRESS

[75] Inventors: Kurt Pollak, Havertown; Raymond F. Boshold, Springfield, both of Pa.

[73] Assignee: Wean United, Inc., Pittsburgh, Pa.

[22] Filed: May 15, 1973

[21] Appl. No.: 360,483

[52] U.S. Cl.......................... 72/270, 72/263, 72/419
[51] Int. Cl............................................. B21c 33/00
[58] Field of Search ............ 72/263, 270, 272, 255, 72/257, 419

[56] References Cited
UNITED STATES PATENTS
2,919,039   12/1959   Hess..................................... 72/419
3,217,527   11/1965   Elger.................................... 72/263

Primary Examiner—Charles W. Lanham
Assistant Examiner—Robert M. Rogers
Attorney, Agent, or Firm—Henry C. Westin; Daniel Patch

[57] ABSTRACT

The disclosure of this invention relates to a loading system for an extrusion, forging or shaping press having a number of workpiece containers adapted to be selectively brought into a workpiece loading station and a pressing station. The system includes a carriage located in the loading station on the side of the container opposite the die assembly. A piston cylinder assembly advances the carriage in the direction of the container in the loading station to assure that a workpiece supported by a carriage can be transferred to the workpiece opening of the container while the container itself is in the process of moving axially of the central axis of pressing, for example, when the container in the pressing station is moving away from the die assembly upon completion of the pressing operation to effect a shearing or stripping of the pressed workpiece.

The production rate of a given press, for example, an extrusion press having a number of containers that are selectively positionable in several stations during the extrusion operation, is to a large extent dependent on the time required to perform the many operations of the entire extrusion cycle, such as the cleaning and preparation of the used container, lubrication, and the loading of a billet and dummy block in a previously prepared container.

4 Claims, 2 Drawing Figures

METHOD AND APPARATUS FOR LOADING WORKPIECES IN A PRESS

The present invention pertains to a method and means for increasing the productivity of a press having multiple containers by providing a workpiece loading system that will allow the workpiece to be inserted in a container when in a loading station while the container is in the process of being moved relative to the die assembly of the press.

It is a still further object of the invention to provide a carriage in said loading station for supporting a billet and dummy block in line with the opening of a container arranged in said loading station, means for advancing said carriage towards the container arranged in the loading station and maintaining the carriage in a billet transferring position relative thereto while the container is moved axially, and other means for transferring said billet and dummy block from the carriage into said opening of the container during said axial movement.

Figure 2:
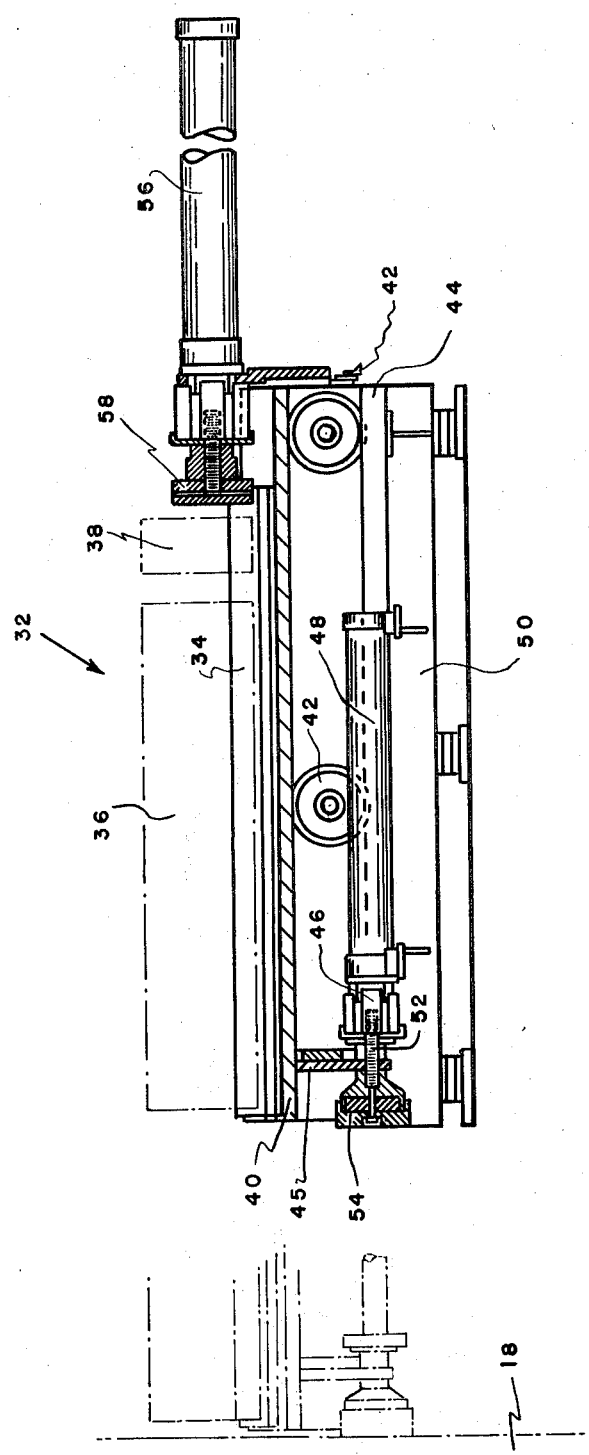

These objects, as well as other novel features and advantages of the present invention, will become more apparent when the following description of one embodiment thereof is read along with the accompanying drawings of which:

FIG. 1 is a plan view of the loading and extrusion stations and a portion of the extrusion press itself incorporating the features of the present invention, and FIG. 2 is a sectional view taken on lines 2—2 of FIG. 1.

FIG. 1, as noted, illustrates a portion of an extrusion press, more particularly, of the container and platen end thereof, the inside face of the platen being shown at 10 having a die assembly 12 in the extrusion station of the press. The extrusion station is legend in the drawing, as is the loading station of the press. The press also has a cooling station which is not shown in the drawing.

As is customary, a number of billet containers are provided between the platen 10 and a crosshead 14 of the press which are adapted to be selectively and succeedingly brought into the various stations where specific operations are performed. Two of the containers 16 and 18 are shown in FIG. 1, the container 16 being shown in the extrusion station and the container 18 in the loading station. The containers are secured to a common hub 20, which according to well-known practice, is mounted concentric about and rotates relative to one of the tension columns 22 of the press. A second tension column of the press is shown at 24.

Before leaving the general description of the portion of the press illustrated, it will be noted that the ram 26 associated with the crosshead 14 is shown in FIG. 1, together with the mechanism for moving the hub 20, and hence, the containers 16 and 18 axially of the center axis of extrusion. This mechanism takes the form of a pair of reciprocating rods, one being shown at 28, having the inner ends connected to the hub 20 by nuts 30 and their outer ends to piston cylinder assemblies not shown.

In still referring to FIG. 1 and particularly, the loading station area, it will be noted that in this station there is provided a billet and dummy block loading system 32 having its major axis parallel to the center axis of extrusion of the press which major axis is co-planar with the axis of the central opening of the container 18. The loading system 32 is best shown in FIG. 2, consisting of a V-shaped trough 34 which is made of a length sufficient to support a billet 36 and a dummy block 38 with their major axes extending horizontally.

The trough 34 is secured to a carriage 40 having two pairs of wheels 42 arranged to engage a pair of rails 44 that run the full length of the carriage 40. To the front of the carriage a bracket 45 is provided to which a rod 46 of a piston cylinder assembly 48 is secured, the cylinder being carried by a sub-frame 50. The rod 46 is continued beyond the bracket 45 where it is provided with an adjustable threaded shaft 52, the outer end of which is secured to a bumper head 54. The vertical face of the head is designed to engage with the adjacent vertical surface of the container 18, as shown in phantom in FIG. 2. The billet 36 and the dummy block 38 are pushed from the trough 34 by a piston cylinder assembly 56 carried at the back of the carriage 42. For this purpose, the rod of the piston cylinder assembly 56 is provided with a pushing plate assembly 58 that engages the adjacent vertical surface of the solid dummy block 38.

In operation, assuming that the relative press elements are in the position shown in FIG. 1 and that the next phase of operation is to move the container 16 away from the die assembly 12 to a position which will permit the shearing of the butt from the extrusion, this initial movement is accomplished by operating the piston cylinder assembly associated with the rods 28. This position has been legend in FIG. 1 along with the end of the stripping position of the container. Prior to this movement of the container 16, which movement also involves the container 18, the piston cylinder assembly 48 of the loading system 32 will have been operated to bring the carriage 40 into an abutted relationship with the container 18, as shown in phantom FIG. 2. Accordingly, as the container 16 is caused to be moved away from the die assembly 12 and during this movement, to either the shearing position and/or the stripping position, the piston cylinder assembly 56 will be operated to transfer the billet 36 and the dummy block 38 into the opening of the container 18. Once transfer is completed, the piston cylinder assemblies 48 and 56 will be retracted to position the carriage 40 and the pusher plate 58 in their initial positions to receive the next billet and dummy block and at the same time allow the containers 16 and 18 to be rotated to their next stations.

In accordance with the provisions of the patent statutes, we have explained the principles and operation of our invention and have illustrated and described what we consider to represent the best embodiment thereof.

We claim:

1. In combination with a press having a number of containers adapted to be selectively brought into a pressing station and an insert loading station, and wherein said containers are supported by a common means arranged to move axially of the center axis of the press workpiece, an insert loading apparatus arranged in said loading station, said apparatus including means for supporting an insert to be received by a container positioned in said loading station, and also including means for maintaining said support means in a position to transfer an insert to a container during at least a portion of the period of said axial movement of said common support means and for so transferring an insert.

2. In combination with a press according to claim 1, wherein said support means includes a carriage, means for supporting said carriage in a manner to move towards and away from an insert receiving opening of a container positioned in said loading station, said means for maintaining and for transferring including a first power means for causing said carriage to maintain an insert in a transferable position with said opening of a container during axial movement of the container, and second power means carried by said carriage for engaging an insert to transfer said insert from said carriage into said opening during said axial movement of the container.

3. In combination with a press according to claim 2, wherein said insert includes a billet and dummy block and said first and second power means include fluid piston cylinder assemblies.

4. A method of inserting a billet in the opening of a container of an extrusion press having a die and separate loading and extrusion station and containers succeedingly positionable in said stations, the steps of:

moving said containers as an unit axially of the die of the press to accomplish a certain operation by the container in the extrusion station, while said movement is taking place supporting a billet by a carriage arranged in front of the opening of a container in said loading station, causing said supported billet to move with the container in said loading station in said axial direction when this container is caused to move to accomplish said certain operation to maintain this container and a supported billet in a relationship that will allow the billet to be transferred from said carriage to the container, and transferring said billet to the opening of the container during said certain movement.

* * * * *